United States Patent [19]

Sterzel

[11] Patent Number: 4,859,639
[45] Date of Patent: Aug. 22, 1989

[54] PROCESS OF MAKING AMORPHOUS SILICON NITRIDE POWDER

[75] Inventor: Hans-Josef Sterzel, Dannstadt-Schauernheim, Fed. Rep. of Germany

[73] Assignee: BASF Aktiengesellschaft, Ludwigshafen, Fed. Rep. of Germany

[21] Appl. No.: 206,753

[22] Filed: Jun. 15, 1988

[30] Foreign Application Priority Data

Jun. 22, 1987 [DE] Fed. Rep. of Germany ....... 3720572

[51] Int. Cl.$^4$ ............................................. C04B 35/58
[52] U.S. Cl. ...................................... 501/97; 501/40; 501/98; 423/344; 423/409
[58] Field of Search ............................. 501/97, 98, 40; 423/344, 409

[56] References Cited

U.S. PATENT DOCUMENTS

| 4,145,224 | 3/1979 | Mehalchick et al. | 501/97 |
| 4,196,178 | 4/1980 | Iwai et al. | 423/409 X |
| 4,517,168 | 5/1985 | Kawahito et al. | 501/97 X |
| 4,734,234 | 3/1988 | Sterzel | 501/97 X |

FOREIGN PATENT DOCUMENTS

| 0091018 | 5/1983 | Japan | 423/344 |
| 0096577 | 5/1985 | Japan | 501/98 |

Primary Examiner—William R. Dixon, Jr.
Assistant Examiner—Karl Group
Attorney, Agent, or Firm—Keil & Weinkauf

[57] ABSTRACT

In amorphous silicon nitride powder, from 0.5 to 40 mol % of the silicon are replaced by one or more of the elements boron, aluminum, yttrium, lanthanum, titanium, zirconium, tungsten and molybdenum.

The powder is obtained by reacting the halides of the corresponding elements, which are dissolved in an inert organic solvent in the particular ratio desired, with ammonia. The solid reaction product formed is separated off from the liquid phase and treated at from 800° to 100° C.

The powder is particularly suitable as a starting material for the production of sintered articles.

3 Claims, No Drawings

PROCESS OF MAKING AMORPHOUS SILICON NITRIDE POWDER

Achieving uniformity from piece to piece is a significant problem in the production of ceramic moldings by sintering processes. Inhomogeneities, such as pores, cracks or the inclusion of foreign bodies, immediately give rise to mechanical stress in these materials which do not undergo plastic deformation, and this stress has an adverse effect on the strength.

Because of the inhomogeneities and microcracks having dimensions of from 0.1 to 20 $\mu$m, it has not been possible to date to produce silicon nitride moldings which have a high load capacity and whose strength, particularly at high temperatures is constant within limits permissible for structural purposes. For use in practice, this is all the more important since there is as yet no reliable non-destructive test method which permits removal of unsuitable moldings.

DE-A 3,504,145 describes a process for the production of pore-free and crack-free moldings of silicon nitride, in which, in a first stage, amorphous silicon nitride powder is compressed at from 1200° to 1350° C. and under a pressure of from 50 to 600 kp/cm$^2$ to give a compact glassy molding and, in a second stage, the silicon nitride is converted into crystalline silicon nitride at from 1400° to 1800° C. without the use of pressure.

An important advantage of this process arises from the fact that, in the stated temperature range of the first stage, the silicon nitride is in a viscoelastic state in which it can be molded with the use of pressure. As a result, the pressure is transmitted uniformly to the molding material, even to remote parts of the mold. The consequence of these effects, which are not present during sintering of ceramic materials which consist of crystalline powders, is that moldings of complicated shape can be produced economically in large numbers in this process by means of a piston-type injection molding machine in production cycles which are limited only by the flow properties of the molding material.

In the second, subsequent process step, the amorphous glassy molding is converted into the actual ceramic molding by crystallization. In this process step, temperatures of from 1400° to 1800° C. are used.

Because of the high viscosity of the material, crystallization is slow to begin. This state is utilized to produce compact pore-free moldings in the first stage, without the use of the sintering assistants otherwise employed, and the amorphous Si$_3$N$_4$ is not converted into crystalline Si$_3$N$_4$ until the second stage, where the said conversion is carried out at higher temperatures.

By avoiding sintering assistants, the strength, rigidity, heat stability and creep resistance are increased and subcritical crack growth which shortens the life is substantially reduced.

We have found that, particularly in the production of moldings having wall thicknesses greater than 2 mm, crystallization takes place too rapidly during viscous flow in the first stage, with the result that the material loses some of its plasticity and compaction ceases prematurely. Moreover, cavities or cracks may be formed in the molding in the crystallization stage, this likewise taking place in the case of relatively thick walls. Crystallization begins at the outer surfaces during heating of the glassy molding and progresses inward, due to the flow of heat. If crystallization takes place too rapidly on the outside, the volume shrinkage gives rise to stresses which cannot be eliminated rapidly enough in the layer which is already largely crystalline on the outside and thus lead to cracking.

To overcome these disadvantages of the process, which in principle is elegant and economical, the time for the crystallization would have to be substantially longer than the time taken for heat flow to equilibrate the material temperature in the center of the molding wall with that of the outer wall, so that crystallization takes place equally rapidly on the outside and inside, and sufficient time is allowed for the plastic deformation required during shrinkage (about 10% b, volume). At the same time, this increases the time span required for compaction in the amorphous state, i.e. premature crystallization is avoided.

It is an object of the present invention to provide an amorphous silicon nitride powder which meets the requirements described.

We have found that this object is achieved if from 0.5 to 40 mol % of the silicon in the amorphous silicon nitride powder are replaced by one or more of the elements boron, aluminum, yttrium, lanthanum, titanium, zirconium, tungsten and molybdenum.

These elements are incorporated in the glass structure via chemical bonds and do not form an independent separate phase in the glass state, i.e. they are not sintering assistants. By incorporation of the stated elements in the Si$_3$N$_4$ glass, crystallization is delayed to the desired extent. Nevertheless, crystallization results in completely crystalline moldings because separate, crystalline nitride phases of the silicon and of the modifying elements form during crystallization.

The novel modified silicon nitride powders can be prepared by reacting the halides of the elements which are present in the powder with ammonia in the complete absence of water and oxygen. Particularly suitable halides are the chlorides, such as SiCl$_4$, BCl$_3$, AlCl$_3$, YCl$_3$, LaCl$_3$, TiCl$_4$, ZrCl$_4$, WCl$_5$, WCl$_3$ and MoCl$_5$. In the case of the silicon, the fluorine compounds, such as H$_2$SiF$_6$ and SiF$_4$, can also be used. In principle, the following procedure may be adopted: a solution of the silicon halides and of the halides of the other elements in the desired ratio in an inert organic solvent is prepared and ammonia is passed into this solution, the corresponding amide or imide compounds being formed, the amides then being converted into the imides by pyrolysis.

To avoid the formation of separate amides or imides during the reaction with ammonia, the Si$_3$N$_4$-modifying metal compound is preferably initially taken in a solvent and reacted with from n-1 to n-2 equivalents of ammonia per metal equivalent, where n is the valency of the metal in the halogen compound. In the case of the trivalent metal halides, this leads to compounds having the structures

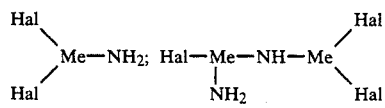

the resulting hydrogen halide reacting with ammonia to give the ammonium halide. The reaction is continued until the amount of free ammonia is only about 1-5% of the original amount used. The reaction is carried out at from −20° to +100° C.

Thereafter, the predetermined amount of silicon halide, preferably silicon tetrachloride, is added and is reacted at the same temperatures with the product formed in the first stage. The necessary amount of ammonia for complete conversion is then added slowly. This procedure results in the mixed imide, which is converted by pyrolysis at from 800° to 1000° C. into the desired modified silicon nitride, the ammonium halide being removed by sublimation.

The complete absence of water and atmospheric oxygen, both during the synthesis and during handling and processing, is essential in order to avoid formation of $SiO_2$ at the powder surface. $SiO_2$ presents problems during subsequent compaction in the glass state.

Suitable inert solvents are hydrocarbons, such as pentane, hexane or heptane or mixtures of these, as well as petroleum ether. Carbon tetrachloride and carbon disulfide are also suitable solvents. These solvents can readily be obtained in anhydrous form and have boiling points which are sufficiently low to permit, for example, the heat of reaction to be readily removed by evaporative cooling.

The novel modified silicon nitride powders are very suitable for the production of ceramic moldings according to German Laid-Open Application DOS No. 3,504,145, where, in a first stage, they are compressed at from 1200° to 1350° C. and under from 50 to 600 kp/cm$^2$ to give a glassy molding. This temperature is either below the temperature at the beginning of crystallization or, in its upper range, is at most only slightly above this temperature, the rate of crystallization at the beginning of crystallization still being sufficiently small that compression to a glassy molding within the processing times required for this purpose cannot be adversely affected. Thereafter, the glassy molding is converted into a crystalline molding at from 1400° to 1800° C. without the use of pressure.

The use of the silicon nitride powders modified according to the invention also proves to be very advantageous for the production of fiber-reinforced and/or whisker-reinforced moldings. The fibers and/or whiskers are mixed with the amorphous powder in the required volume ratio and the mixture is then pressed at above the glass transition temperature to give a compact molding. Because of the delayed crystallization, there is sufficient time to permit flow around all fibers and/or whiskers and to avoid pore formation.

The moldings produced using the novel modified silicon nitride powders can be used as structural elements having a high load capacity in piston engines, gas turbines, heat exchangers or exhaust gas turbochargers or, for example, as cutting tools for machining.

EXAMPLE 1

19.0 g (corresponding to 0.1 mole) of TiCl$_4$ were dissolved in 250 ml of dry carbon tetrachloride at 20° C. A solution of 3.4 g (corresponding to 0.2 mole) of ammonia in carbon tetrachloride was run in, with stirring and cooling, and the temperature was kept constant. The cloudy reaction mixture was then stirred for a further 2 hours, after which it was transferred to a stirred vessel which already contained a solution of 153.1 g (corresponding to 0.9 mole) of SiCl$_4$, dissolved in 2 l of carbon tetrachloride. Stirring was continued for 1 hour at 50° C., after which a solution of about 170 g (10 moles) of ammonia, dissolved in 2 l of carbon tetrachloride, was slowly run in while the carbon tetrachloride boiled. When the addition was complete, stirring was continued for a further 2 hours, after which the solid was filtered off from the solvent. The solid was transferred to an oven and its temperature was increased linearly by 200° C. per hour to 900° C. Elimination of ammonia and sublimation of ammonia chloride resulted in an amorphous modified silicon nitride in which 10 mol % of the silicon had been replaced by titanium.

The tendency to crystallization was measured in a differential scanning calorimeter at a heating rate of 40° C./min up to 1000° C. and at a heating rate of 16° C./min above 1000° C. The temperature at the beginning of crystallization, $T_{KB}$, which is shown in the Table below, is a measure of the tendency to crystallization. The higher $T_{KB}$, the lower is the tendency to crystallization.

EXAMPLE 2

The procedure described in Example 1 was followed, except that, instead of TiCl$_4$, 7.5 g (0.05 mole) of boron trichloride were used, the boron trichloride being reacted with 1.7 g (0.1 mole) of ammonia. The resulting reaction mixture was reacted with 161.4 g (0.95 mole) of silicon tetrachloride, similarly to Example 1.

EXAMPLE 3

The procedure described in Example 1 was followed, except that, instead of TiCl$_4$, 30.3 g (0.13 mole) of zirconium tetrachloride were reacted with 4.5 g (0.26 mole) of ammonia, and the reaction mixture was reacted with 149 g (0.87 mole) of silicon tetrachloride.

EXAMPLE 4

The procedure described in Example 1 was followed, except that, instead of carbon tetrachloride, carbon disulfide was used as the solvent. 10.68 g (0.08 mole) of aluminum chloride were reacted with 2.72 g (0.16 mole) of ammonia. The resulting reaction mixture was reacted with 156.5 g (0.92 mole) of silicon tetrachloride. The further procedure was carried out as described in Example 1.

EXAMPLE 5

A procedure similar to that described in Example 4 was used and 13.68 g (0.07 mole) of yttrium chloride were reacted with 2.04 g (0.12 mole) of ammonia, and the reaction mixture was reacted with 158.2 g (0.93 mole) of silicon tetrachloride.

EXAMPLE 6

A procedure similar to that described in Example 4 was used and 22.08 g (0.09 mole) of lanthanum chloride were reacted with 3.06 g (0.18 mole) of ammonia, and the reaction mixture was further reacted with 154.8 g (0.91 mole) of silicon tetrachloride.

EXAMPLE 7

A procedure similar to that described in Example 4 was used and 13.68 g (0.05 mole) of molybdenum(V) chloride were reacted with 2.55 g (0.15 mole) of ammonia, and this mixture was further reacted with 161.6 g (0.95 mole) of silicon tetrachloride.

EXAMPLE 8

A procedure similar to that described in Example 4 was used and 10.84 g (0.03 mole) of tungsten(V) chloride were reacted with 1.53 g (0.09 mole) of ammonia, and this mixture was further reacted with 165.0 g (0.97 mole) of silicon tetrachloride.

In the Table below, the $T_{KB}$ of the products obtained according to Examples 1 to 8 is compared with that of the unmodified silicon nitride.

| Example | Composition of the metal part in mol % | | Temperature at beginning of crystallization (°C.) |
|---|---|---|---|
| | Si | Modifying component | |
| Unmodified | $Si_3N_4$ | | 1,220 |
| 1 | 90 | 10 Ti | 1,350 |
| 2 | 95 | 5 B | 1,320 |
| 3 | 87 | 13 Zr | 1,410 |
| 4 | 92 | 8 Al | 1,340 |
| 5 | 93 | 7 Y | 1,350 |
| 6 | 91 | 9 La | 1,400 |
| 7 | 95 | 5 Mo | 1,420 |
| 8 | 97 | 3 W | 1,400 |

The Table shows that the temperature at the beginning of crystallization of the modified silicon nitride powder is not less than 100° C. higher than that of the unmodified $Si_3N_4$ powder.

I claim:

1. A process for the preparation of an amorphous silicon nitride powder, from 0.5 to 40 mol % of the silicon being replaced by at least one modifying metal selected from the group consisting of boron, aluminum, yttrium, lanthanum, titanium, zirconium, tungsten and molybdenum, which comprises:
   in a first step, passing ammonia into a solution of the halides of said modifying metals in an organic solvent in an amount of n-1 to n-2 equivalents of ammonia per metal equivalent, n denoting the valency of the modifying metal in said halide;
   in a second step, adding an initial amount of silicon halide followed by further amounts to effect complete conversion of the halides to produce a reaction product;
   in a third step, separating the reaction product from the solvent; and
   in a fourth step, heating the reaction product into an amorphous modified silicon nitride powder a temperature of at from 800° to 1000° C.

2. A process according to claim 1, wherein the first and second steps are carried out at from −20° to +100° C.

3. A process according to claim 1, wherein the solvent is selected from the group consisting of pentane, hexane, heptane and mixtures thereof, petroleum ether, carbon tetrachloride and carbon disulfide.

* * * * *